UNITED STATES PATENT OFFICE.

CARLETON ELLIS, OF BROOKLINE, MASSACHUSETTS.

COMPOSITION FOR REMOVING PAINT AND VARNISH AND PROCESS OF MAKING SAME.

SPECIFICATION forming part of Letters Patent No. 714,880, dated December 2, 1902.

Application filed February 10, 1902. Serial No. 93,468. (No specimens.)

*To all whom it may concern:*

Be it known that I, CARLETON ELLIS, of Brookline, in the county of Norfolk and State of Massachusetts, have invented a certain new and useful Composition for Removing Paint and Varnish and Process of Making Same, of which the following is a specification.

My new process consists in the dissolution of a wax or waxy body in a hydrocarbon oil or other suitable solvent and the subsequent precipitation of this wax in a gelatinous state by the addition of an alcoholic body miscible with the solvent employed. The solvent is, preferably, benzol or its homologues, toluol or xylol. Other bodies, such as the ethers, chlorids of carbon, light hydrocarbons from petroleum, &c., which are good solvents for waxes and which are miscible with alcoholic bodies, fall into the category of the solvents included in this process. The alcoholic body or gelatinizing agent must be miscible with the solvent and in itself have at the most only a slight solvent action on waxes. Methyl, ethyl, butyl, amyl, allyl, and benzyl alcohol are included in the class of gelatinizers. The requirement in the case of the wax or waxy body is that it dissolves readily in the solvent, as hereinbefore described, and that it precipitates or gelatinizes on the addition of alcohol to the solution. The waxes or waxy bodies which may be employed in the gelatinization process are the waxes proper, such as beeswax and carnauba wax; mineral waxes, such as paraffin, ceresin, or ozokerite; glycerids, as Japan wax or curriers' hard grease; metallic soaps, such as aluminium palmitate or oleate, zinc or magnesium stearate, barium or manganese resinate. A suitable composition for general purposes can be obtained by the solution by heat of four parts each of paraffin and currier's hard grease in eight parts of benzol. This solution while still warm is gelatinized by the gradual addition of seven parts of methyl alcohol. The mixture should be rapidly stirred until cold.

A composition for removing coats of paint or varnish must contain an energetic softening or loosening agent. This, it is evident, is secured in my process by the combination of a penetrating hydrocarbon or analogous solvent with a softening agent, the alcoholic body. Such a mixture in itself would, however, be ineffectual, owing to its tendency to evaporate and to the difficulty in applying to vertical surfaces. These difficulties are overcome and the composition given the requisite consistency by the gelatinization process, as hereinbefore described.

The chlorids of carbon referred to as "solvents" would embrace dichlormethane, chloroform, and the tetrachlorid of carbon. Curriers' hard grease is not a homogeneous compound. It is a complex mixture of high-melting-point fats—*e. g.*, glycerids of palmitic and stearic acids, solid hydrocarbons similar to paraffin, cholesterol, cholesterol ethers and degras-former.

What I claim, and desire to secure by Letters Patent of the United States, is—

1. The process herein described for producing a composition for removing paint and varnish which consists in adding an alcoholic body to a solution of a suitable wax.

2. The process of producing a paint and varnish remover by the solution of a wax or waxy body in an aromatic hydrocarbon and the addition of an alcoholic body to induce gelatinization substantially as described.

3. The process of thickening or gelatinizing a composition which softens dried paint or varnish by the precipitation of a dissolved wax by means of an aliphatic alcohol substantially as described.

4. The process for producing a composition for removing paint and varnish by the dissolution of a wax or mixtures of waxes in benzol and the subsequent precipitation by an alcohol substantially as set forth.

5. The process for producing a composition for removing paint and varnish by the solution of a wax or waxy body in benzol and the subsequent precipitation by methyl alcohol substantially as described.

6. A composition for removing paint and varnish consisting of a wax, a solvent for the wax and an alcohol combined substantially as described.

7. A composition for removing paint and varnish consisting of a wax, an aromatic hydrocarbon as a solvent for the wax, and an alcohol combined substantially as described.

8. A composition for removing paint and varnish consisting of a wax dissolved in benzol or its immediate homologues and gelatinized by the addition of an alcohol substantially as described.

9. A composition for removing paint and varnish consisting of four parts each of paraffin and curriers' hard grease, eight parts benzol and seven parts methyl alcohol substantially as described.

In testimony whereof I have affixed my signature in presence of two witnesses.

CARLETON ELLIS.

Witnesses:
HENRY B. CHALMERS,
DAVID A. HINCKS.